(12) United States Patent
Roberts et al.

(10) Patent No.: US 12,395,911 B2
(45) Date of Patent: *Aug. 19, 2025

(54) IN-NETWORK WIRELESS INTERFERENCE DETECTION

(71) Applicant: Calix, Inc., San Jose, CA (US)

(72) Inventors: Harold A. Roberts, Excelsior, MN (US); Daniel J. Sills, Moss Beach, CA (US); Eric I. Leal, Richardson, TX (US)

(73) Assignee: Calix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,304

(22) Filed: Mar. 26, 2024

(65) Prior Publication Data

US 2024/0236798 A1 Jul. 11, 2024

Related U.S. Application Data

(63) Continuation of application No. 17/649,764, filed on Feb. 2, 2022, now Pat. No. 11,985,562.

(51) Int. Cl.
*H04W 36/20* (2009.01)
*H04L 5/00* (2006.01)
*H04W 36/06* (2009.01)
*H04W 72/0453* (2023.01)
*H04W 72/541* (2023.01)

(52) U.S. Cl.
CPC ........... *H04W 36/20* (2013.01); *H04L 5/0073* (2013.01); *H04W 36/06* (2013.01); *H04W 72/0453* (2013.01); *H04W 72/541* (2023.01)

(58) Field of Classification Search
None
See application file for complete search history.

(56) References Cited

U.S. PATENT DOCUMENTS 6,272,348 B1 * 8/2001 Saario ............... H04W 16/12
455/448
11,985,562 B2 * 5/2024 Roberts ............. H04W 36/06
(Continued)

OTHER PUBLICATIONS

Notice of Allowance from U.S. Appl. No. 17/649,764 dated Feb. 28, 2024, 18 pp.

*Primary Examiner* — The Hy Nguyen
(74) *Attorney, Agent, or Firm* — Shumaker & Sieffert, P.A.

(57) ABSTRACT

A system for interference detection includes one or more processors are configured to receive from one or more access points within a wireless network information indicative of airtime usage of one or more client devices associated with the one or more access points, determine an amount of total interference for at least one of the access points on a first channel, the total interference including foreign interference and in-network interference, determine a correlation between the total interference and the airtime usage of the one or more client devices, determine an amount of the foreign interference or an amount of the in-network interference based on the correlation, and selectively switch the at least one of the access points from communicating on the first channel to communicating on a second channel based on the determined amount of the foreign interference or the determined amount of the in-network interference.

20 Claims, 6 Drawing Sheets

(56) References Cited

U.S. PATENT DOCUMENTS

| | | | |
|---|---|---|---|
| 2011/0096679 A1* | 4/2011 | Hayashino | H04W 72/541 |
| | | | 370/252 |
| 2014/0056250 A1* | 2/2014 | Cattoni | H04W 72/02 |
| | | | 370/329 |
| 2017/0272963 A1 | 9/2017 | Rengarajan et al. | |
| 2017/0290023 A1* | 10/2017 | Zhu | H04L 5/0032 |
| 2018/0288767 A1 | 10/2018 | Hahn | |
| 2021/0051676 A1* | 2/2021 | Pezeshki | H04W 72/542 |
| 2021/0111815 A1 | 4/2021 | Dion et al. | |
| 2023/0247508 A1 | 8/2023 | Roberts et al. | |

* cited by examiner

IN-NETWORK WIRELESS INTERFERENCE DETECTION

This application is a continuation of U.S. patent application Ser. No. 17/649,764, filed on Feb. 2, 2022, the contents of which are incorporated by reference in their entirety.

TECHNICAL FIELD

This disclosure relates to networking, and more particularly, communication between client devices and access points in a wireless network.

BACKGROUND

A wireless network, such as a wireless network configured for operation in accordance with the Wi-Fi protocols, and includes access points and client devices. One or more processors may be configured to select a channel on which the access points and the client devices wirelessly communicate. For example, the one or more processors may determine interference on two or more channels, and select the channel having the least amount of interference as the channel on which the access points and client devices wirelessly communicate.

SUMMARY

In general, this disclosure describes example techniques for one or more processors to distinguish between true interference, such as from foreign sources (referred to as foreign interference), and in-network interference (also called friendly fire interference or phantom interference) to allow the one or more processors to more accurately determine interference levels on a channel. In one or more examples, in-network interference may refer to the interference received by an access point that is due to other devices in the wireless network of the access point communicating with one another (e.g., interference received by a first access point caused by a second access point communicating with a client device), such as when there is a switch in channel. That is, in-network interference may be considered as the interference that travels when there is a switch in channels. For example, in-network interference is interferences in devices on a common network where the communication channel on the devices changes together.

The in-network interference may be caused by airtime usage of one or more client devices of the wireless network that appears as interference. As described in more detail below, if there is correlation between airtime usage of one or more client devices and the total interference determined by the one or more processors (e.g., total interference goes up or down based on airtime usage of one or more client devices), then the one or more processors may determine that at least a portion of the total interference is due to airtime usage of one or more client devices (e.g., in-network interference) and not interference from a foreign source.

One or more processors may be configured to determine a correlation between total interference (e.g., interference that includes both foreign interference and in-network interference) and airtime usage of one or more client devices of the wireless network. Based on the correlation, the one or more processors may be configured to determine the amount of foreign interference or in-network interference (e.g., classify how much of the total interference is from in-network interference and how much of the total interference is from foreign interference).

Determining the actual foreign interference, rather than relying on the total interference, may allow the one or more processors (e.g., the one or more processors tasked with changing a channel in a network) to more accurately select a channel on which the access points and the client devices are to communicate. For example, the one or more processors may determine whether access points and the client devices that form a network are to switch channels. The one or more processors may periodically determine on which channel the access points and client devices should communicate, such as based on amount of interference. When evaluating channel interference for a current channel, the one or more processors may determine the total interference on the current channel (e.g., foreign interference and in-network interference). When evaluating channel interference on another channel, since the other channel is not in use for in-network communication, there may be no in-network interference, and only foreign interference. In-network communication refers to communication within a network on which a determination is made whether to switch channels.

However, if the one or more processors switch the channel from the current channel to the other channel, then the in-network interference that was present on the current channel will also become present on the other channel. This is because the access points and client devices that generated the in-network interference on the current channel will generate the in-network interference on the other channel. Accordingly, by accounting for the in-network interference, the one or more processors may be able to more accurately determine the amount of interference on a channel, which may result in more accurate determinations of whether to switch channels.

In one example, the disclosure describes a system for interference detection, the system comprising: memory; and one or more processors coupled to the memory and configured to: receive from one or more access points within a wireless network, for storage in the memory, information indicative of airtime usage of one or more client devices associated with the one or more access points; determine an amount of total interference for at least one of the access points on a first channel, the total interference including foreign interference and in-network interference; determine a correlation between the total interference and the airtime usage of the one or more client devices; determine an amount of the foreign interference or an amount of the in-network interference based on the correlation; and selectively switch the at least one of the access points from communicating on the first channel to communicating on a second channel based on the determined amount of the foreign interference or the determined amount of the in-network interference.

In one example, the disclosure describes a method of interference detection, the method comprising: receiving, with one or more processors, from one or more access points within a wireless network information indicative of airtime usage of one or more client devices associated with the one or more access points; determining, with the one or more processors, an amount of total interference for at least one of the access points on a first channel, the total interference including foreign interference and in-network interference; determining, with the one or more processors, a correlation between the total interference and the airtime usage of the one or more client devices; determining, with the one or more processors, an amount of the foreign interference or an amount of the in-network interference based on the correlation; and selectively switching, with the one or more processors, the at least one of the access points from communicating on the first channel to communicating on a second channel based on the determined amount of the foreign interference or the determined amount of the in-network interference.

In one example, the disclosure describes a computer-readable storage medium storing instructions thereon that when executed cause one or more processors to: receive from one or more access points within a wireless network information indicative of airtime usage of one or more client devices associated with the one or more access points; determine an amount of total interference for at least one of the access points on a first channel, the total interference including foreign interference and in-network interference; determine a correlation between the total interference and the airtime usage of the one or more client devices; determine an amount of the foreign interference or an amount of the in-network interference based on the correlation; and selectively switch the at least one of the access points from communicating on the first channel to communicating on a second channel based on the determined amount of the foreign interference or the determined amount of in-network interference.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1A:
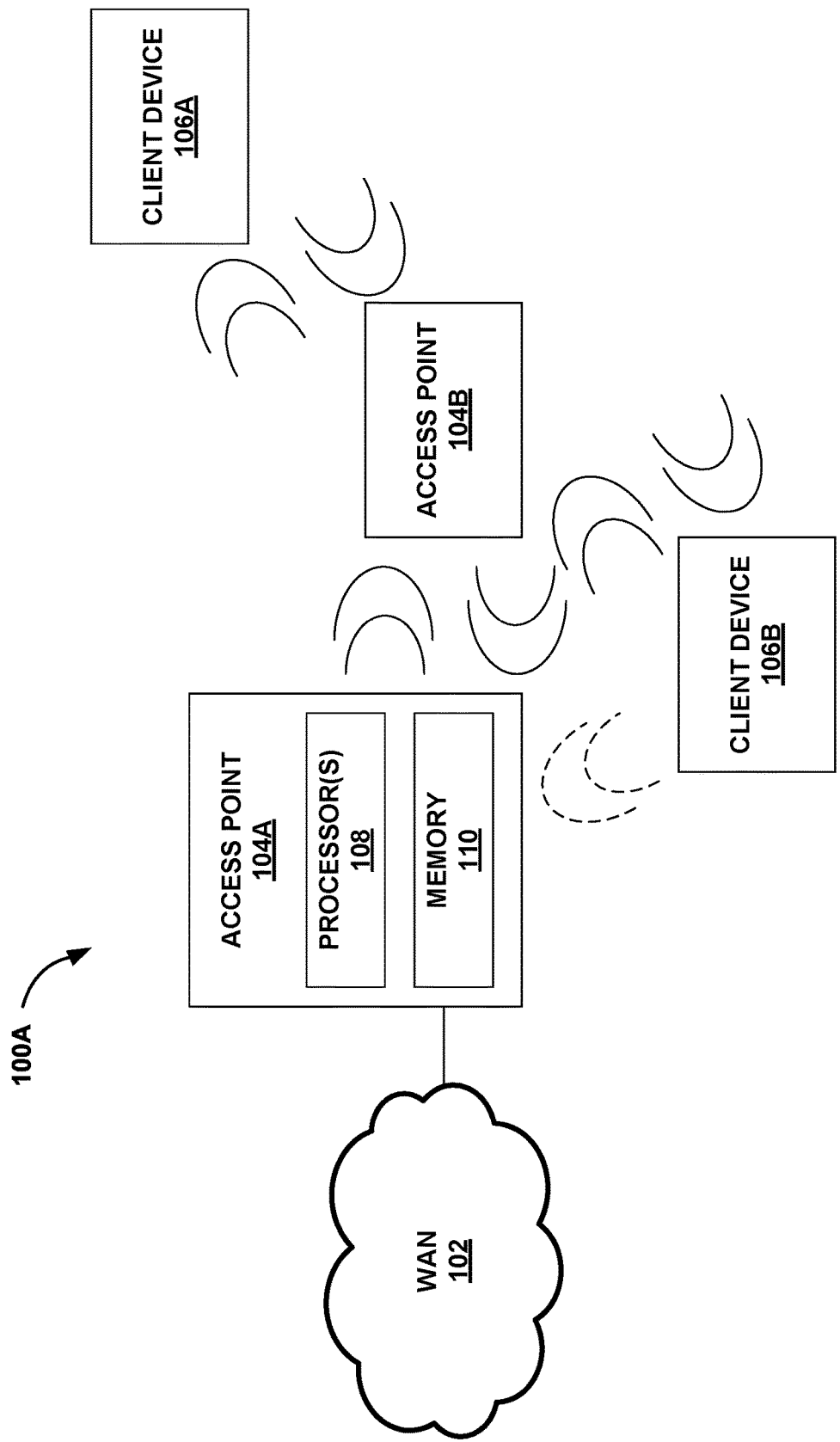
FIGS. 1A-1C are block diagrams illustrating example wireless networks, in accordance with one or more aspects of this disclosure.

A wireless network includes one or more access points and one or more client devices. For communication, each client device may be associated with one of the access points. For instance, in one example wireless network topology, a first access point may be a gateway router that couples to a wide area network (WAN) (e.g., Internet). The first access point may communicate with a plurality of other access points (e.g., within a premises), and the plurality of other access points may wirelessly communicate with one or more client devices (e.g., computers, smartphones, tablets, smart watches, Internet of Things (IoT) devices, etc.). The plurality of other access points may be routers, extenders, repeaters, and the like. The first access point may also wirelessly communicate with one or more client devices.

The client devices and access points may wirelessly communicate on a particular channel. One or more processors may be configured to identify the channel on which the client devices and access points are to communicate. The one or more processors may be part of an access point, or may be located remotely in a cloud computing environment.

As one example, the one or more processors may be configured to determine interference on a plurality of channels, and select the channel having the least interference. In a wireless network with a single access point that provides coverage for the entire premise, the one or more processors may be able to easily distinguish interference from valid data communication transmitted or received by the single access point. For instance, if the received communication is not from one of the client devices, the received communication may be considered as interference.

If a premise includes multiple access points (e.g., extender or repeaters), the wireless network may still be considered a single wireless network. However, in such cases, interference on an access point may be due to other access points in the wireless network and the client device communicating with the other access points, in addition to interference from devices that are not part of the wireless network. In this disclosure, interference at an access point due to client devices and other access points communicating with one another is referred to as in-network interference, also called friendly fire interference or phantom interference. Interference at an access point due to other sources (e.g., not in-network interference) is referred to as foreign interference or "true" interference.

This disclosure describes example techniques for the one or more processors to determine how much of the interference at an access point is due to foreign interference and how much is due to in-network interference. The one or more processors may distinguish between foreign interference and in-network interference to more accurately evaluate the interference on a channel.

Foreign interference refers to any radio frequency power within the band of the channel(s) actively being used by the network that includes the access points and client devices, of an amplitude high enough to degrade in-network communication, that is not due to communication within the network (i.e., between the access points and client devices within the network). Examples of foreign interference include but are not limited to: microwave oven, baby monitors, neighboring Wi-Fi networks, Bluetooth communications, etc.

As described above, in-network interference may refer to the interference received by an access point that is due to other devices in the wireless network of the access point communicating with one another (e.g., interference received by a first access point caused by a second access point communicating with a client device), such as when there is a switch in channel. That is, in-network interference may be considered as the interference that travels when there is a switch in channels. For example, in-network interference is interferences in devices on a common network where the communication channel on the devices changes together. The total interference may include both the foreign interference and the in-network interference.

For instance, an access point may be communicating on a first channel. The one or more processors may determine a total interference for the access point on the first channel (e.g., the total interference includes in-network interference and foreign interference). The one or more processors may also determine an interference for the access point on a second channel. In this case, as there is no in-network communication on the second channel, there may be no in-network interference, and only foreign interference. In-network communication refers to communication within a network on which a determination is made whether to switch channels. For instance, a network may include access points and client devices that are controlled by one or more processors tasked with determining whether to switch channels on which the access points and client devices communicate.

In some scenarios, because the one or more processors measured only foreign interference on the second channel, the interference on the second channel may be measured as being less than the interference on the first channel. In response, the one or more processors may switch one or more of the access points from communicating on the first channel to communicating on the second channel. However, in this case, the in-network interference that was present on the first channel will transfer to the second channel as the access points and client devices communicate on the second channel. For example, the in-network interference was due to the client devices and access points communicating with one another on the first channel. When the one or more processors switch to the second channel, the in-network interference will now be present on the second channel due to the client devices and access points communicating on the second channel.

Accordingly, in some examples, an interference on a second channel may appear to be artificially lower than the interference on a first (e.g., current channel) because the in-network interference is not yet present. By distinguishing between in-network interference and foreign interference, the one or more processors may be configured to compare the foreign interference on the first channel to the interference on the second channel to more accurately determine whether the second channel has less overall interference than the first channel.

There may be various ways in which the one or more processors may determine the source of the interference (e.g., whether interference is in-network interference or foreign interference). As one example, the one or more processors may receive information indicative of the airtime usage of the client devices. The airtime usage may be indicative of an amount of time within a period of time during which an access point was transmitting or receiving (i.e., communicating) data with the client devices associated with that access point. For instance, the airtime usage for an access point may indicate that the access point was communicating for 100 millisecond in a 1000 millisecond period of time.

The one or more processors may determine a correlation between the total interference for an access point on a first channel, where the total interference includes foreign interference and in-network interference, and the airtime usage of the one or more client devices. For instance, memory coupled to the one or more processors may store multiple samples of the amount of total interference (e.g., samples taken over length of time, such as many minutes). A first sequence of samples may be the multiple samples of the amount of total interference. Memory coupled to the one or more processors may store multiple samples of the amount of airtime usage of the one or more client devices. One or more additional sequences of samples may be the multiple samples of the amount of airtime usage of the one or more client devices (e.g., first additional sequence is for airtime usage for first client device, second additional sequence is for airtime usage for second client device, etc.).

The one or more processors may determine a time correlation between the first sequence of samples and the one or more additional sequences of samples. For instance, the one or more processors may determine a correlation value indicative of the correlation between the total interference and the airtime usage of the one or more client devices. The one or more processors may determine whether the correlation value satisfies a threshold (e.g., whether the correlation value is indicative of there being correlation between the total interference and the airtime usage of the one or more client devices). Based on the correlation value satisfying the threshold, the one or more processors may subtract the airtime usage of at least one of the one or more client devices from the total interference to determine the foreign interference.

Accordingly, in one or more examples, one or more processors may be configured to receive from one or more access points within a wireless network information indicative of airtime usage of one or more client devices associated with the one or more access points. The one or more processors may determine an amount of total interference for at least one of the access points on a first channel. As described above, the total interference includes foreign interference and in-network interference. The one or more processors may determine a correlation between the total interference and the airtime usage of the one or more client devices, determine an amount of the foreign interference or an amount of the in-network interference based on the correlation, and selectively switch the at least one of the access points from communicating on the first channel to communicating on a second channel based on the determined amount of the foreign interference or the determined amount of the in-network interference.

Figure 1B:
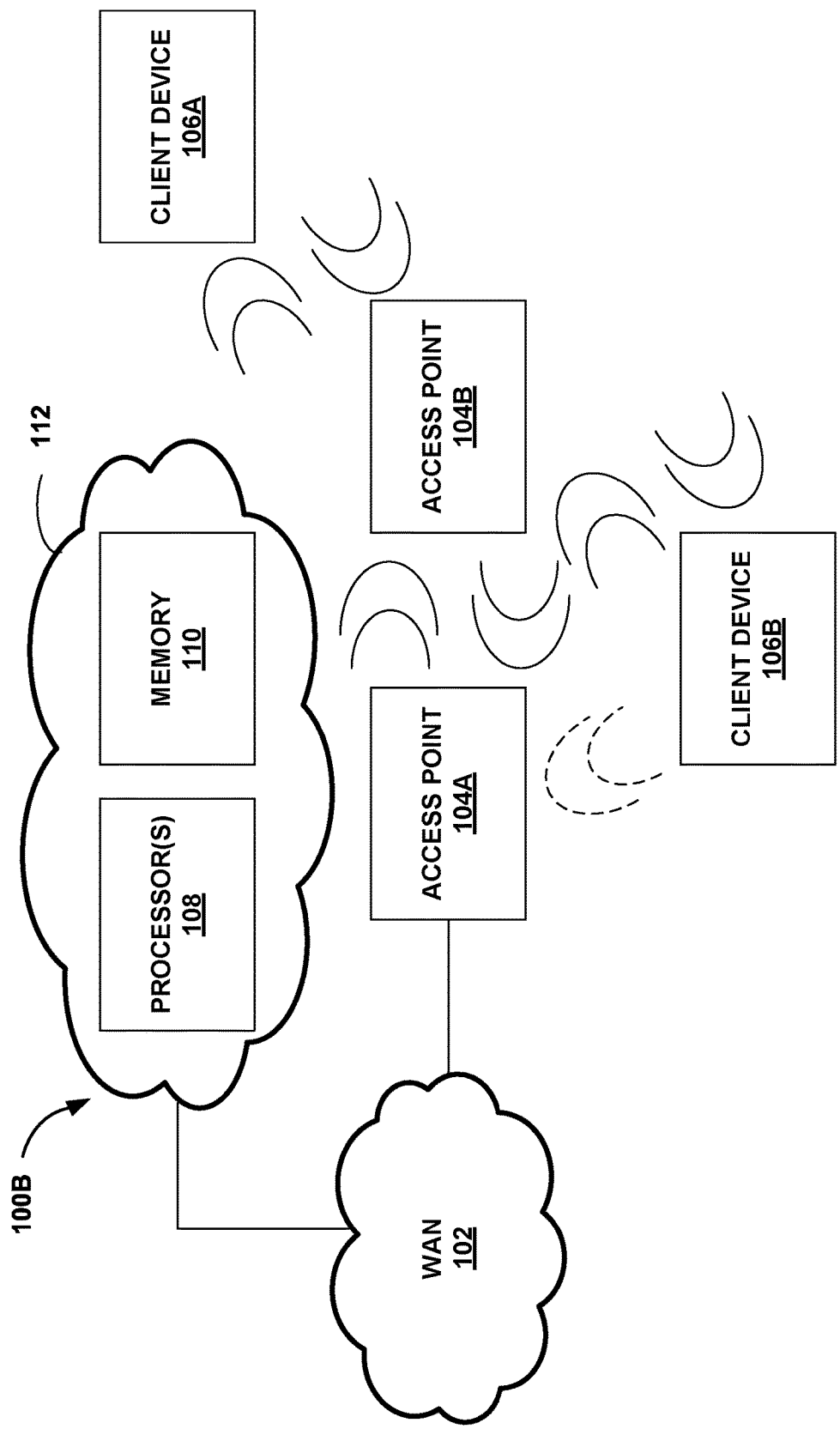
Figure 1C:
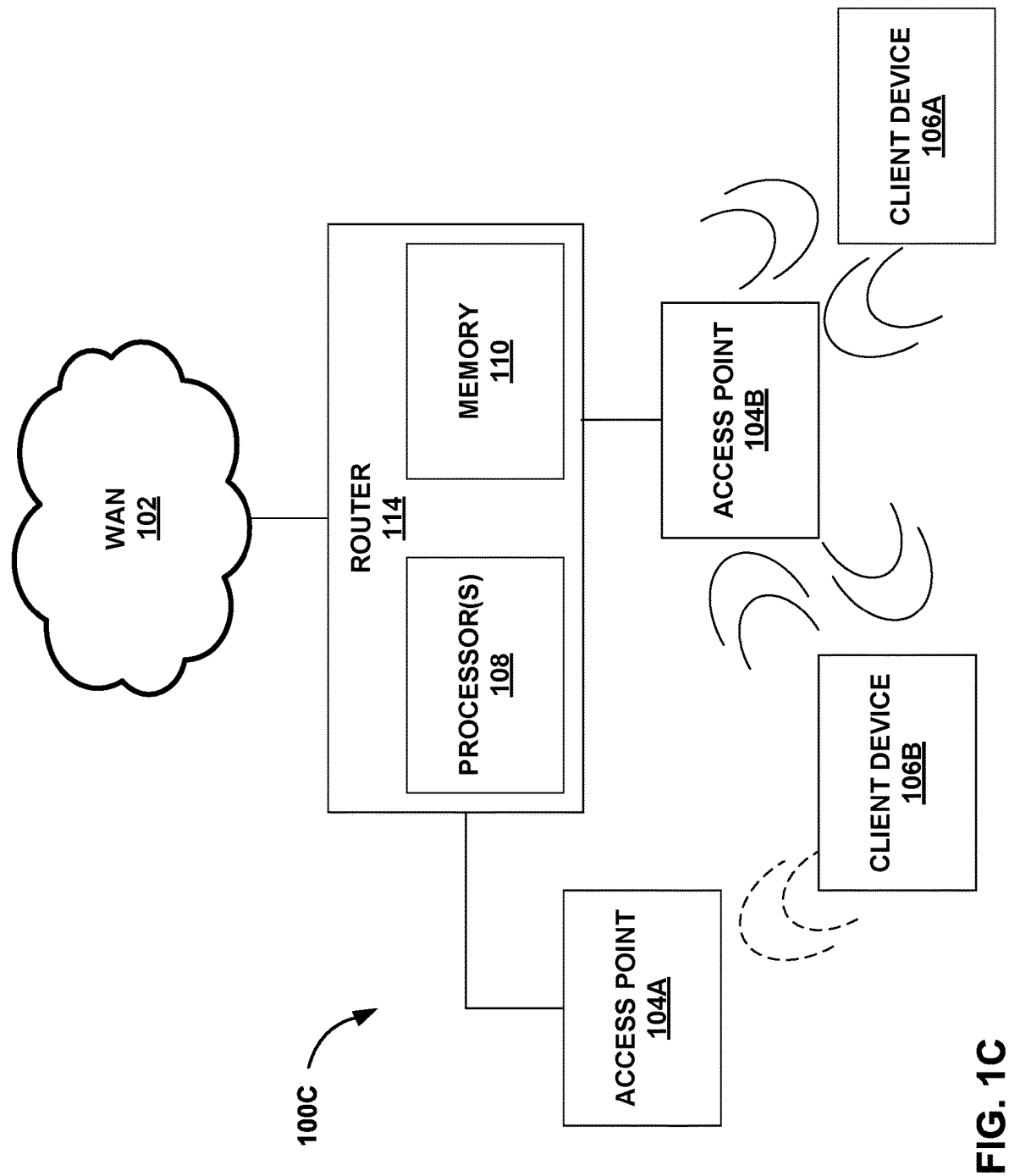

FIGS. 1A-1C are block diagrams illustrating example wireless networks, in accordance with one or more aspects of this disclosure. For instance, FIGS. 1A-1C illustrate wireless networks 100A-100C, respectively. Wireless networks 100A-100C may be multi-node channelized wireless networks, such as wireless networks that operate in accordance with the Wi-Fi protocols. Wireless networks 100A-100C may be wireless networks within a premise, such as a home, school, business, etc. However, the example techniques are not limited to requiring wireless networks 100A-100C be located within a single premise, and may extend across multiple buildings.

Wireless networks 100A-100C include access point 104A, access point 104B, client device 106A, and client device 106B. Access points 104A, 104B may be networking hardware devices that provide wireless connectivity to client devices 106A, 106B. Examples of access points 104A, 104B include routers, extenders, repeaters, and the like. Examples of client devices 106A, 106B include subscriber devices that can communicate wirelessly such as computers, smartphones, smartwatches, tablet computing devices, Internet-of-Things (IoT) devices, and the like. Although, for simplicity of illustration, two access points 104A, 104B are illustrated, and two client devices 106A, 106B are illustrated, the example techniques are not so limited. There may be more access points 104, and more or fewer client devices 106 than illustrated.

As illustrated in FIGS. 1A-1C, wireless networks 100A-100C may communicate with wide area network (WAN) 102. One example of WAN 102 is the Internet. For instance, as illustrated in FIGS. 1A and 1B, access point 104A provides access to WAN 102 to other access points (e.g., access point 104B) and client devices 106A, 106B. In FIGS. 1A and 1B, access point 104A may be considered as a gateway access point (e.g., AP-G). Access point 104B may be considered as a repeater access point (e.g., AP-R).

As illustrated in FIG. 1C, router 114 provides access to WAN 102 to access points 104A, 104B and client devices 106A, 106B. Router 114 may be coupled to access points 104A, 104B through a cabled (e.g., wired) connection, such as fiber optic cable, Ethernet cable, twisted pair cable, coaxial cables, etc.). For instance, in an enterprise setting, router 114 may be coupled to access points 104A, 104B through a cabled connection, and access points 104A, 104B may communicate with respective client devices 106A, 106B wirelessly. However, it is possible for router 114 to communicate with access points 104A, 104B wirelessly as well.

FIGS. 1A-1C illustrate one or more processors 108 and memory 110. As described in more detail, one or more processors 108 (e.g., together with memory 110) may be configured to perform the example techniques described in this disclosure. Examples of one or more processors 108 include one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements (e.g., such as in an integrated circuit (IC) or a set of ICs). Examples of memory 110 include RAM, ROM, EEPROM, optical disk storage, magnetic disk storage, flash memory, and the like.

In the example of FIG. 1A, one or more processors 108 and memory 110 may be part of access point 104A. For instance, access point 104A may be a gateway access point, and may be configured to monitor and analyze wireless network 100A. For instance, access point 104A may be configured to select a channel on which access points 104A, 104B and client devices 106A, 106B are to communicate in accordance with examples described in this disclosure.

In the example of FIG. 1B, one or more processors 108 and memory 110 may be part of cloud computing environment 112, e.g., within one or more servers. Cloud computing environment 112 may provide storage and computing power for wireless network 110B. For instance, one or more processors 108 and memory 110 may be distributed across cloud computing environment 112. In one or more examples, in addition to providing storage and computing power to wireless network 110B, cloud computing environment 112 may monitor and analyze wireless network 110B (e.g., monitor bandwidth, determine whether any of access points 104A, 104B or client devices 106A, 106B are not operating correctly, assign client devices 106A, 106B to access points 104A, 104B, and the like). One example of cloud computing environment 112 may be the Support CalixCloud® cloud computing environment. In some examples, cloud computing environment may be configured to select a channel on which access points 104A, 104B and client devices 106A, 106B are to communicate in accordance with examples described in this disclosure.

In the example of FIG. 1C, router 114 includes one or more processors 108 and memory 110. For instance, in an enterprise, router 114, which may be a gateway router, may be configured to analyze and monitor wireless network 100C, and, accordingly, one or more processors 108 and memory 110 may be part of router 114. In some examples, router 114 may be configured to select a channel on which access points 104A, 104B and client devices 106A, 106B are to communicate in accordance with examples described in this disclosure. In some examples, router 114 may be a wired device that is coupled to access points 104, 104B through a wired connection, but the techniques are not so limited.

FIGS. 1A-1C illustrate various example locations of one or more processors 108 and memory 110, but the example techniques should not be considered limited to these examples. One or more processors 108 and memory 110 may be located in other components as well.

As described above, one or more processors 108 may be configured to select a channel on which access points 104A, 104B and client devices 106A, 106B are to communicate (e.g., on which at least one of access points 104A, 104B is to communicate). A channel refers to a particular frequency at which access points 104A, 104B and client devices 106A, 106B communicate. For instance, the IEEE 802.11 standard provides radio frequency ranges for wireless communication that include 900 MHz, 2.4 GHz, 3.6 GHz, 4.9 GHz, 5 GHz, 5.9 GHz, 6 GHz, and 60 GHz bands, as a few examples. Each frequency range is divided into multiple channels, where the channels are numbered at 5 MHz spacing within a band, with 60 GHz band having channels with 2.16 GHz spacing.

To determine a channel on which access points 104A, 104B and client devices 106A, 106B are to communicate, one or more processors 108 may select a channel such that interference from nearby networks and other sources is mitigated. One example technique to select the channel is to measure the amount of interference there is on a given channel (e.g., either from Wi-Fi sources, such as in nearby networks, or non-Wi-Fi sources, such as household appliances).

There may be various example ways to measure the amount of interference. As one example, one or more processors 108 may evaluate whether received communication is packetized in accordance with Wi-Fi protocols, and if not, one or more processors 108 may determine that the received communication is interference. As another example, in the event that the received communication is packetized in accordance with Wi-Fi protocols, one or more processors 108 may evaluate whether the received communication was sent from a device with which the receiving access point is associated (e.g., based on the packet header). If the packet header does not match a device associated with the receiving access point, one or more processors 108 may determine that the received communication is interference. There may be other ways in which to measure interference, and the example techniques should not be considered limited to the examples described herein.

One or more processors 108 may measure the amount of interference on a current channel and measure the amount of interference on other, target channels. If the interference is lower on one of the other channels, one or more processors 108 may select the other channel as the channel on which access points 104A, 104B and client devices 106A, 106 should communicate. If the interference lower on the current channel, one or more processors 108 may not switch from the current channel.

In examples where there is only one access point (e.g., only one of access points 104A, 104B), any interference on a channel at the access point may be from foreign sources, referred to as foreign interference. Also, the foreign interference would be present on the other channels as well. However, in examples where there are multiple access points, such as in FIGS. 1A-1C, communication to and from client devices 106A, 106B associated with one of the access points (e.g., access point 104B) may appear to be interference to an access point (e.g., access point 104A) that is not associated with a client device.

For instance, in the examples of FIGS. 1A-1C, client devices 106A, 106B may be associated with access point 104B. Accordingly, client devices 106A, 106B may transmit and receive communication from access point 104B, and access point 104B may transmit and receive communication from client devices 106A, 106B. Access point 104A may not be associated with either of client devices 106A, 106B.

Access point 104A may communicate (e.g., transmit and receive communication) from access point 104B.

In the examples of FIGS. 1A-1C, due to the proximity of access point 104A to client device 106B, as illustrated in dashed lines, communication that client device 106B transmits to access point 104B may also be measured as interference by access point 104A. That is, because access point 104A is not associated with client device 106B, the transmission from client device 106B to access point 104B appears as interference to access point 104A.

In this disclosure, interference measured at access point 104A that originates due to one or more client devices 106A, 106B communicating with access points 104B is referred to as in-network interference. That is, interference measured at an access point due to communication between client devices and other access points is referred to as in-network interference, such as interference that transfers to another channel when communication is switched from the current channel to the other channel. In this disclosure, interference measured at access point 104A that originates outside of wireless networks 100A-100C is referred to as foreign interference, true interference, or actual interference.

For instance, assume there is another access point, with a client device on this other access point. In such as example, when this other access point is communicating with the other access point, there may not be in-network interference on access point 104A because to the extent there is interference, the cause of interference is not from communication between access points 104A, 104B and client devices 106A, 106B of wireless networks 100A-100C that includes access points 104A, 104B and client devices 106A, 106B. In this case, such interference may be considered as foreign interference. Other examples of foreign interference include microwave oven, baby monitors, neighboring Wi-Fi networks, Bluetooth communications, etc.

Accordingly, one or more processors 108 may determine total interference at access point 104A on a first channel, where the total interference includes foreign interference and in-network interference. In some techniques, based on the total interference, one or more processor 108 may determine whether to switch communication of access points 104A, 104B and client devices 106A, 106B from the first channel to a second channel. For example, one or more processors 108 may periodically determine "free airtime." Free airtime may be a measure of how much additional overhead is available in the event that additional bandwidth needs to be allocated. If the free airtime is less than a threshold value, one or more processors 108 may determine whether to switch channels to a channel where there is possibly more free airtime.

As one example, one or more processors 108 may determine an amount of time that inference is present within a time period (e.g., a first time value). One example of the time period is 1000 milliseconds. One or more processors 108 may determine an amount of time within that time period of airtime usage of access points 104A, 104B and client devices 106A, 106B (e.g., a second time value). The airtime usage of access points 104A, 104B and client devices 106A, 106B may be the amount of time that client devices 106A, 106B are communicating (e.g., transmitting and receiving) and the amount of time that access points 104A, 104B are communicating (e.g., transmitting and receiving). The free airtime is the summation of the first time value and the second time value subtracted from the time period (e.g., 1000 millisecond). For instance, if the first time value (e.g., amount of time that inference is present within a time period) is 200 millisecond, the second time value (e.g., airtime usage of access points 104A, 104B and client devices 106A, 106B) is 500 ms, and the time period is 1000 millisecond, the free airtime is 300 millisecond (e.g., 1000 millisecond−(200 millisecond+500 millisecond)).

Using free airtime as criteria for determining whether to switch communicating on a first channel (e.g., current channel) to a second channel (e.g., another channel) is one example and should not be considered as limiting. In some examples, one or more processors 108 may periodically determine whether to switch channels.

As described above, in some examples, one or more processors 108 may utilize the total interference for determining whether to switch channels. However, there may be possibilities that one or more processors 108 incorrectly determine that the interference on another channel is less than the interference on the current channel when utilizing the total interference.

For example, assume that the current channel is a first channel, and a target channel is a second channel. One or more processors 108 may determine the total interference for the first channel, which includes the foreign interference on the first channel and the in-network interference on the first channel. One or more processors 108 may then determine the interference on the second channel. However, because access points 104A, 104B and client devices 106A, 106B are not communicating on the second channel in wireless networks 100A-100C, there may be no in-network interference on the second channel (e.g., in-network second channel). In this example, one or more processors 108 may determine the foreign interference on the second channel, and determine the foreign interference as the total interference on the second channel, as there may be no in-network interference.

If one or more processors 108 determine that the interference on the second channel is less than the interference on the first channel, one or more processors 108 may cause access points 104A, 104B, and client devices 106A, 106B to communicate on the second channel. In this case, the in-network interference that was present on the first channel, but not yet present on the second channel when the interference determination was made for the second channel, may transfer from the first channel and on to the second channel. This is because the in-network interference is from access points 104A, 104B and client device 106A, 106B communicating with one another, and access points 104A, 104B and client device 106A, 106B will now communicate with one another on the second channel. Accordingly, the total interference on the second channel will increase. However, in the determination by one or more processors 108 to switch from the first channel to the second channel, one or more processors 108 failed to account for the in-network interference.

Accordingly, one or more processors 108 may use interference measurements on the current channel to factor into a decision to change the channel to a better (lower interference) channel. The problem with in-network interference is that when one or more processors 108 change channel, the in-network interference follows to the new channel since the in-network interference is on the communication between access points and client devices (which may be all on the same channel).

Therefore, in-network interference makes the current channel look worse than it is. Since a site scan for better channels will not include in-network interference, the alternative channels look better than they really are, compared to the current channel, in terms of interference. This can cause a thrashing of channel changes in an attempt by one or more processors 108 to escape the in-network interference generated by the system itself.

In one or more examples, one access point 104B associated with client devices 106A, 106B may be referred to as a basic subscriber set (BSS). In cases where there are multiple access points (e.g., access points 104A, 104B) providing coverage such as extenders or repeaters (e.g., access point 104B is an extender or repeater) in addition to a root access point or gateway (e.g., access points 104A), wireless network 100A-100C may be referred to as an extended BSS (EBSS).

An EBSS node may determine the transmit and receive traffic from its own BSS and the associate airtime that is used. For example, access point 104A may track the amount of time that access point 104A transmits traffic (e.g., data) to and receives traffic from access point 104B (e.g., airtime usage of access point 104B).

However, in the examples of FIGS. 1A-1C, it may be complicated to determine airtime usage, such as where access point 104B is a repeater or extender. For instance, assume that the connection from the access point 104A to access point 104B is on a 5 GHz radio. Assume that access point 104B only has a single 5 GHz radio and therefore communicates with the subtending 5 GHz client devices 106A, 106B (e.g., over the "fronthaul") via the same radio that it communicates with access point 104A (e.g., the "backhaul").

Focusing on downstream traffic from the access point 104A to client devices 106A, 106B, which is traffic through access point 104B, access point 104A may be able to determine the airtime usage of the traffic access point 104A sends to access point 104B. Access point 104B may then relay the traffic to client devices 106A, 106B, and in this case, access point 104B may determine airtime usage used for transmitting to client devices 106A, 106B. In one or more examples, access point 104A may receive the transmissions from the access point 104B given that access point 104A is close enough in proximity to access point 104B to provide a good backhaul connection to access point 104B.

Access point 104A may determine that these transmissions from access point 104B are 'true' interference (e.g., foreign interference) but such transmission are instead in-network interference (e.g., friendly fire interference). Addressing such in-network interference (i.e., in-network interference caused by transmissions from access point 104B) may be addressed by subtracting the airtime usage of access point 104B transmitting. For example, with information from both access point 104A and access point 104B, one or more processors 108 may subtract the airtime transmissions (e.g., airtime usage) from access point 104B from the interference measurements from access point 104A to obtain the foreign interference. That is, determining the in-network interference caused by access point 104B transmitting may be relatively easy as one or more processors 108 may receive information indicating the amount of time that access point 104B was transmitting, and one or more processors 108 may subtract the amount of time that access point 104 was transmitting from the determined total interference to determine the foreign interference.

However, a more difficult situation arises when there are upstream transmissions from client devices 106A, 106B to access point 104B. For example, in the case of client device 106A, the upstream transmission of traffic (e.g., transmission from client device 106A) may be sufficiently attenuated that, by the time traffic (e.g., transmitted data) reaches access point 104A, that access point 104A may not detect the traffic. That is, the transmission from client device 106A may be sufficiently attenuated by the time the transmission reaches access point 104A, that the transmission may not register as interference. In the case of client device 106B, the transmissions to access point 104B are also heard by access point 104A (e.g., due to the proximity of client device 106B to access point 104A) and detected as interference when in fact the transmission is in-network interference. In FIGS. 1A-1C, the dashed lines from client device 106B show that transmission from client device 106B can be received by access point 104A even though access point 104A is not a recipient of direct transmission from client device 106B.

When there is transmission from client devices 106A, 106B that can possibly be in-network interference, one or more processors 108 may not simply subtract the transmissions from all client devices 106A, 106B to access point 104B from the interference measurement by access point 104A since only the transmissions from one of the two client devices 106A, 106B (e.g., client device 106B) was detected as interference by access point 104A. Stated another way, the transmission from client devices 106A, 106B may be considered as in-network interference for access point 104A. It may be possible to determine the amount of time that client devices 106A, 106B transmitted to access point 104B, and subtract that amount of time (e.g., airtime usage) from the total interference that access point 104A determined (e.g., measured) to determine the foreign interference.

However, such techniques could be incorrect. For instance, transmission from client device 106A is not received by access point 104A. Therefore, client device 106A does not contribute to the total interference measured by access point 104A. However, if the airtime usage (e.g., time that client device 106A transmitted) were subtracted from the total interference measured by access point 104A, the result would be an incorrect indication of the foreign interference because the transmission from client device 106A did not contribute to the total interference measured by access point 104A.

In some examples, if one or more processors 108 collected airtime statistics (e.g., airtime usage) from all client devices 106A, 106B, and not just those associated with access point 104A, then using the source or destination address of client devices 106A, 106B, one or more processors 108 may be able to determine that communication from client devices 106A, 106B were part of valid in-network (EBSS) traffic (e.g., in-network interference). That is, in some examples, one or more processors 108 may evaluate source or destination addresses in communications that access point 104A receives. One or more processors 108 may determine if the received communication originated from one or more client devices 106A, 106B even though the received communication is not for access point 104A. One or more processors 108 may then remove the airtime usage of the received communications from client devices 106A, 106B from the total interference to determine the foreign interference. In other words, based on the source or destination address of communication received by access point 104A, one or more processors 108 may classify the received communication as in-network interference for subtraction from the total interference.

However, there may be issues with using source and destination addresses of communication received by access point 104A for classifying in-network interference. As one example, one or more processors 108 may not be configured to collect such information (e.g., source and destination addresses) from unassociated transmissions (e.g., from client devices 106A, 106B that are not associated to access point 104A). One example reason why one or more processors 108 may not be configured to collect information from unassociated transmissions is the possibility of overloading the processing resources and degrading performance.

Also, the ability of one or more processors 108 to determine the source and destination address may be based on the signal strength from client devices 106A, 106B being sufficiently high when received by access point 104A so that one or more processors 108 can properly reconstruct the source and destination addresses from the received traffic. In some examples, the signal strength of the traffic received by access point 104A may be sufficiently attenuated that one or more processors 108 cannot determine the source or destination address. However, the signal strength of the traffic may still be sufficiently high to cause interference. In such cases, one or more processors 108 may not be able to classify the transmission from client devices 106A, 106B as in-network interference because the source or destination address were not recoverable, and may incorrectly classify transmission from client devices 106A, 106B as foreign interference.

This disclosure describes example techniques for one or more processors 108 to accurately determine foreign interference in the total interference that may overcome the issues described above. For example, as described in more detail, one or more processors 108 may utilize correlation techniques to determine whether transmissions from one or more client devices 106A, 106B correlate with the total interference determined by one or more processors 108. If there is correlation, one or more processors 108 may determine that transmissions of data from one or more of client devices 106A, 106B is causing in-network interference, and determine the foreign interference based on the amount of data that one or more client devices 106A, 106B are transmitting. If there is no correlation, one or more processors 108 may determine that there is no in-network interference.

In one or more examples, one or more processors 108 may not need to reconstruct transmissions from client devices 106A, 106B to determine the amount of data or traffic transmitted by client devices 106A, 106B (e.g., airtime usage of client devices 106A, 106B). Rather, one or more processors 108 may receive airtime usage information from respective access points 104A, 104B with which client devices 106A, 106B are associated.

For example, in FIGS. 1A-1C, client devices 106A, 106B are associated with access point 104B. Access point 104B may track the airtime usage of client devices 106A, 106B. Access point 104B may be configured to transmit airtime usage information of client devices 106A, 106B to one or more processors 108. Accordingly, when requested, access point 104B may transmit the airtime usage information of client devices 106A, 106B to one or more processors 108.

As illustrated in FIGS. 1A-1C, airtime usage of client device 106B (e.g., transmission by client device 106B) may be interference received by access point 104A, but airtime usage of client device 106A (e.g., transmission by client device 106A) may not be interference received by access point 104A because of attenuation from the relative distance of client device 106A and access point 104A. However, access point 104B may track airtime usage of client devices 106A, 106B.

In one or more examples, one or more processors 108 may receive from one or more access points (e.g., access point 104A) within a wireless network (e.g., wireless networks 100A-100C), for storage in memory 110, information indicative of airtime usage of one or more client devices 106A, 106B associated with the one or more access points (e.g., access point 104B). One or more processors 108 may determine an amount of total interference for at least one of the access points (e.g., access point 104A) on a first channel. The total interference may include foreign interference and in-network interference. One or more processors 108 may determine a correlation between the total interference and the airtime usage of the one or more client devices 106A, 106B, and determine an amount of the foreign interference based on the correlation or an amount of the in-network interference based on the correlation. In this disclosure, one or more processors 108 determining an amount of the foreign interference or an amount of the in-network interference includes determining only the amount of the foreign interference, only the amount of the in-network interference, or both the amount of the foreign interference and the amount of the in-network interference.

Correlation, as used in this disclosure, refers to a measure of how connected the total interference and airtime usage of one or more client devices 106A, 106B are. For there to be correlation, when the airtime usage of one of client devices 106A, 106B increases or decreases there may result an increase or decrease in the total interference. For there not to be correlation, when the airtime usage of one of client devices 106A, 106B increases or decreases, there may be a consistent change in the total interference.

To determine the correlation between the total interference and the airtime usage of one or more client devices 106A, 106B, one or more processors 108 may evaluate multiple samples of the total interference and the airtime usage of one or more client devices 106A, 106B. For example, one or more processors 108 may determine (e.g., measure) N number of samples of the total interference measured over X amount of time (e.g., 5 samples over one minute). One or more processors 108 may receive, from access point 104B, N number of samples of airtime usage of client device 106A measured over X amount of time, and receive, from access point 104B, N number of samples of airtime usage of client device 106B measured over X amount of time.

The multiple samples of the total interference may be a first sequence that includes multiple samples of the amount of total interference, and the multiple samples of airtime usage of client devices 106A, 106B may be one or more additional sequences that each include multiple samples of the airtime usage of one or more client devices 106A, 106B. For instance, a second sequence may include multiple samples of the airtime usage of client device 106A, and a third sequence may include multiple samples of the airtime usage of client device 106B, and so forth.

To determine the correlation between the total interference and the airtime usage of one or more client devices 106A, 106B, one or more processors 108 may determine a time correlation between the first sequence and each of the one or more additional sequences. As one example, to determine the correlation between the total interference and the airtime usage of one or more client devices 106A, 106B, one or more processors 108 may be configured to determine a correlation value indicative of the correlation between the total interference and the airtime usage of one or more client devices 106A, 106B. One example way to perform the correlation is determining the "Pearson correlation coefficient," where the Pearson correlation coefficient is one example of the coefficient value indicative of the correlation between the total interference and the airtime usage of one or more client devices 106A, 106B.

Other correlation techniques may be possible as well, including machine-learning based correlation techniques.

For instance, in machine-learning based correlation techniques, a computing device configured to learn in accordance with machine-learning may be given inputs of known correlated sequences and known sequences that are not correlated for training and generating a trained model. One or more processors 108 may receive the trained model and implement the trained model for determination of correlation between the total interference and the airtime usage of one or more client devices 106A, 106B.

In one or more examples, one or more processors 108 may compare the correlation value to a threshold. If the correlation value satisfies a threshold (e.g., is greater than the threshold), one or more processors 108 may determine that airtime usage from one or more of client devices 106A, 106B is correlated with the total interference. For example, if the sequence of samples of airtime usage for client device 106B correlates with the sequence of samples of the total interference, then one or more processors 108 may determine that the airtime usage of client device 106B is also present as part of the total interference. If the sequence of samples of airtime usage for client device 106A does not correlate with the sequence of samples of the total interference, then one or more processors 108 may determine that the airtime usage of client device 106A is not present as part of the total interference.

As explained above, one or more processors 108 may determine an amount of the foreign interference or an amount of the in-network interference based on the correlation. For example, based on the correlation value satisfying the threshold (e.g., the correlation value is greater than the threshold), one or more processors 108 may determine that the airtime usage from client devices 106A, 106B that correlates with the total interference is the in-network interference.

As another example, one or more processors 108 may subtract the airtime usage of at least one of the one or more client devices from the total interference to determine the foreign interference. For instance, if the airtime usage of client device 106B is correlated with the total interference, one or more processors 108 may subtract the airtime usage of client device 106B from the total interference. Because the airtime usage of client device 106A is not correlated with the total interference, one or more processors 108 may not subtract the airtime usage of client device 106B form the total interference. Therefore, one or more processors 108 subtracting airtime usage of client device 106B from the total interference may result in the foreign interference.

There may be other ways in which one or more processors 108 may determine the amount of the foreign interference or the amount of the in-network interference. In general, one or more processors 108 may determine the amount of the foreign interference or the amount of the in-network interference based on the which ones of client devices 106A, 106B have airtime usage that correlates with the total interference.

One or more processors 108 may selectively switch the at least one of the access points (e.g., access points 104A, 104B) from communicating on the first channel to communicating on a second channel based on the determined amount of the foreign interference or the determined amount of the in-network interference. For example, one or more processors 108 may determine an amount of interference in the wireless network on the second channel, compare the amount of interference in the wireless network on the second channel to the amount of the foreign interference, and selectively switch the at least one of the access points 104A, 104B from communicating on the first channel to communicating on the second channel based on the comparison (e.g., if the interference on the second channel is less than the foreign interference on the first channel).

As another example, one or more processors 108 may determine an amount of interference in the wireless network on the second channel, and add the determined in-network interference to the amount of interference in the wireless network on the second channel to determine a hypothetical total interference on the second channel. One or more processors 108 may compare the hypothetical total interference on the second channel to the total interference on the first channel, and selectively switch the at least one of the access points 104A, 104B from communicating on the first channel to communicating on the second channel based on the comparison (e.g., if the hypothetical total interference on the second channel is less than the total interference on the first channel).

Figure 2:
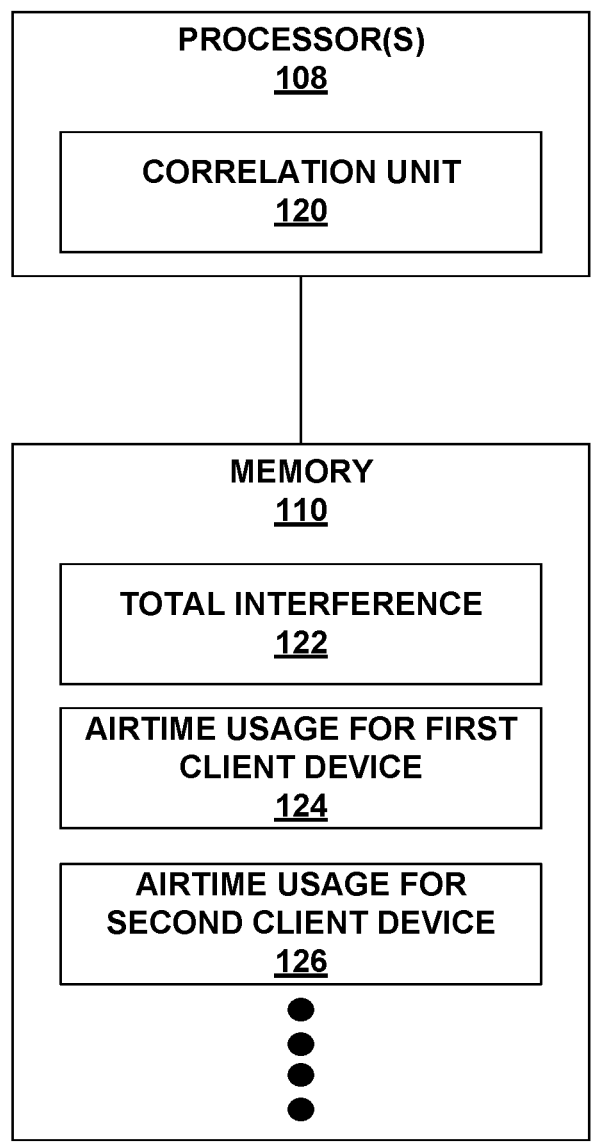
FIG. 2 is a block diagram illustrating an example of one or more processors and memory, in accordance with one or more aspects of this disclosure.

FIG. 2 is a block diagram illustrating an example of one or more processors and memory, in accordance with one or more aspects of this disclosure. As illustrated in FIG. 2, one or more processors 108 include correlation unit 120. Correlation unit 120 may be distributed across one or more processors 108, such as in the cloud computing environment of FIG. 1B, or may be part of a single processor in examples where there is only one processor 108. Correlation unit 120 may be implemented as fixed-function circuitry or programmable circuitry (e.g., software executing on one or more processors 108).

FIG. 2 also illustrates memory 110. As illustrated, memory 110 stores total interference 122, airtime usage for first client device 124, airtime usage for second client device 126, and so forth. For example, total interference 122 may be the total interference that one or more processors 108 determined (e.g., measured) for access point 104A on a first channel. Total interference 122 may include foreign interference and in-network interference.

As described throughout, the in-network interference may be interference caused by at least one of the one or more client devices 106A, 106B communicating with at least one of the one or more access points (e.g., access point 104B) in wireless network 100A-100C that transfers with channel switching. The amount of total interference may be considered as a first time value indicative of an amount of time that interference is present within a time period (e.g., X millisecond within 1000 millisecond), and the information indicative of the airtime usage may be considered as respective second time values indicative of respective amounts of time that the one or more client devices 106A, 106B communicate during the time period (e.g., client device 106A communicates for Y ms within 1000 millisecond, and client device 106B communicates for Z millisecond within 1000 millisecond).

Airtime usage for first client device 124 may be the amount of time that client device 106A transmitted to access point 104B, and airtime usage for second client device 126 may be the amount of time that client device 106B transmitted to access point 104B. For instance, one or more processors 108 may receive from access point 104B, for storage in memory 110, information indicative of airtime usage of client device 106A (e.g., airtime usage for first client 124) associated with access point 104B and information indicative of airtime usage of client device 106B (e.g., airtime usage for second client 126) associated with access point 104B.

In one or more examples, total interference 122, airtime usage for first client device 124, and airtime usage for second client device 126 may be respective sequences that includes multiple samples. For example, total interference 122 may be a first sequence that includes multiple samples of the amount of total interference that was measured over time. Airtime usage for first client device 124 may be a second sequence that includes multiple samples of the airtime usage of client device 106A. Airtime usage for second client device 126 may be a third sequence that includes multiple samples of the airtime usage of client device 106B. The first, second, and third sequences may be overlapping in time, and in some examples may account for the exact same amount of time. However, the techniques are not so limited.

In one or more examples, one or more processors 108 may receive the airtime usage for first client device 124 and airtime usage for second client device 126 from access point 104B. In some examples, it may be possible to approximate airtime usage by using the number of bytes sent by client devices 106A, 106B and the PHY rate the bytes were sent at. Higher PHY rates allow a given number of bytes to be sent in a shorter amount of time. One or more processors 108 may receive such information as the information indicative of airtime usage of one or more client devices associated with the one or more access points.

Correlation unit 120 may be configured to determine a correlation between the total interference and the airtime usage of one or more client devices 106A, 106B. There may be various ways in which correlation unit 120 may determine the correlation, such as by using a Pearson correlation coefficient or machine-learning (e.g., artificial intelligence) techniques. In some examples, correlation unit 120 may determine a correlation value indicative of the correlation between the total interference and the airtime usage of one or more client devices 106A, 106B (e.g., determine a first correlation value for correlation between total interference and airtime usage of client device 106A, determine a second correlation value for correlation between total interference and airtime usage of client device 106B, and so forth).

For example, correlation unit 120 may be configured to determine a time correlation between a first sequence that includes multiple samples of the amount of total interference and one or more additional sequences that each include multiple samples of the airtime usage of the one or more client devices 106A, 106B (e.g., the second sequence that includes multiple samples of the airtime usage of client device 106A and the third sequence that includes multiple samples of the airtime usage of client device 106B). For example, correlation unit 120 may determine a first correlation between the total interference and the first airtime usage of the first client device 106A. Correlation unit 120 may determine a second correlation between the total interference and the second airtime usage of the second client device 106B.

In some examples, for client devices 106A, 106B that are stationary or move slowly, the correlation can be done over longer time periods and hence more accurately. It may be determined that every millisecond of transmissions from client device 106B, as received by access point 104B, will result in the same number of milliseconds of perceived interference on the part of access point 104A or perhaps something less than 100% if the signal is moderately weak by the time it is received by access point 104A. The amount of correlation between the total interference and the airtime usage of client devices 106A, 106B may indicate how many milliseconds should be subtracted to determine the foreign interference.

One or more processors 108 may be configured to determine an amount of the foreign interference or an amount of the in-network interference based on the correlation. For example, one or more processors 108 may determine an amount of the foreign interference or an amount of the in-network interference based on the total interference and the airtime usages of client devices 106A, 106B that correlate with the total interference. As described above, one or more processors 108 determining an amount of the foreign interference or an amount of the in-network interference includes one or more processors 108 determining only the amount of the foreign interference, only the amount of the in-network interference, or both the amount of the foreign interference or the amount of the in-network interference.

As one example, to determine the amount of in-network interference, one or more processors 108 may sum the airtime usage of all client devices 106A, 106B whose airtime usage correlates with the total interference (e.g., whose correlation value satisfies a threshold, such as by being greater than a threshold). As one example, to determine the amount of foreign interference, one or more processors may subtract the airtime usage of all client devices 106A, 106B whose airtime usage correlates with the total interference (e.g., whose correlation value satisfies a threshold, such as by being greater than a threshold) from the total interference.

One or more processors 108 may selectively switch the at least one of the access points 104A, 104B from communicating on the first channel to communicating on a second channel based on the determined amount of the foreign interference or the determined amount of the in-network interference. For example, as described above, one or more processors 108 may determine an amount of interference in the wireless network on the second channel, compare the amount of interference in the wireless network on the second channel to the amount of the foreign interference, and selectively switch the at least one of the access points 104A, 104B from communicating on the first channel to communicating on the second channel based on the comparison (e.g., if the interference on the second channel is less than the foreign interference on the first channel).

As another example, one or more processors 108 may determine an amount of interference in the wireless network on the second channel, and add the determined in-network interference to the amount of interference in the wireless network on the second channel to determine a hypothetical total interference on the second channel. One or more processors 108 may compare the hypothetical total interference on the second channel to the total interference on the first channel, and selectively switch the at least one of the access points 104A, 104B from communicating on the first channel to communicating on the second channel based on the comparison (e.g., if the hypothetical total interference on the second channel is less than the total interference on the first channel).

Figure 3:
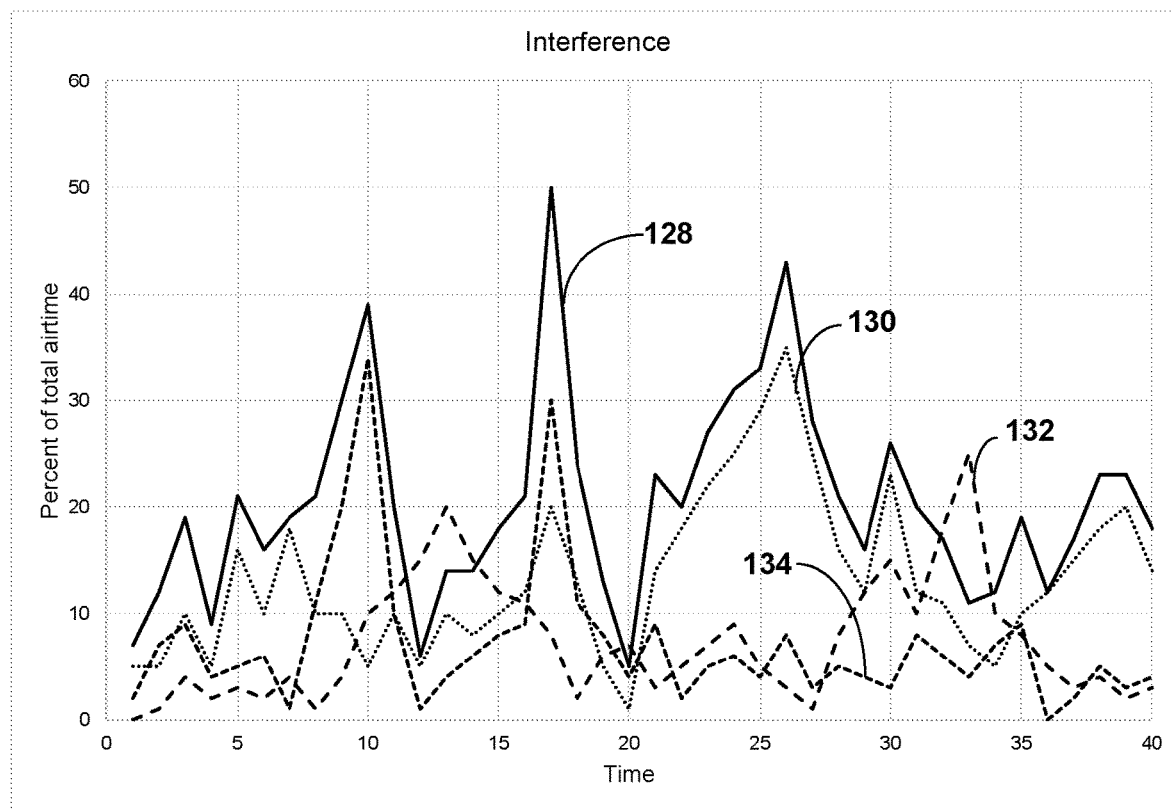
FIG. 3 is a graph illustrating an example of interference levels at an access point.

FIG. 3 is a graph, of friendly fire interference detection, illustrating an example of interference levels at access point 104A. In FIG. 3, the horizontal axis represents time, and the vertical axis represents percent of total airtime. In the example of FIG. 3, if access point 104A experiences in-network (e.g., friendly fire) interference from client device 106B due to the transmissions (e.g., airtime usage) client device 106B sends to access point 104B, the total interference measured by access point 104A may be the sum of the foreign (e.g., authentic) interference and the transmissions from client device 106B to access point 104B (e.g., the in-network interference).

Line 128 represents the total interference as measured by access point 104A. In the example of FIG. 3, there seems to be a correlation with the measured interference of access point 104A (e.g., total interference) and the airtime usage of client device 106B (e.g., the amount of time that access point 104B received traffic from client device 106B), as shown with line 134.

By using the measured received airtime from access point 104B of client device 106A and client device 106B (e.g., airtime usage of client devices 106A, 106B), FIG. 3 illustrates that when access point 104B is receiving transmissions from client device 106B there is a peak of interference as measured by access point 104A as shown around times 10 and 17 milliseconds. There may not be a correlation from client device 106A. The only high period (>20%) of 'true' interference is shown at time 26 as per the authentic interference airtime curve represented by line 130.

From the data in FIG. 3, a 'Pearson correlation coefficient' (ranges from −1 to +1) may be calculated (e.g., by one or more processors 108) by comparing the airtime usages of client devices 106A, 106B (available as data elements from access point 104B) to the Interference Detected by curve (e.g., total interference curve). A Pearson coefficient of 1 means perfect correlation (i.e., identical curves), 0 means no correlation, and −1 means an inverse correlation.

In FIG. 3, line 132 represents the airtime usage from client device 106A. As can be seen, there does not appear to be much correlation between total interference, represented by line 128 and airtime usage from client device 106A, represented by line 132. For example, in the example of FIG. 3, for client device 106A, the resulting coefficient is −0.16 (e.g., the correlation value is −0.16). However, for client device 106B, the resulting coefficient is 0.63 (e.g., the correlation value is 0.63). Assuming some reasonable threshold for concluding signals are correlated, such as 0.5, one or more processors 108 may determine that client device 106A is not interfering with access point 104A, but client device 106B is interfering with access point 104A. One or more processors 108 may subtract the airtime usage of client device 106B (e.g., amount of time that client device 106B is transmitting) from the total Interference Detected by access point 104A, and the result is the 'Authentic Interference' (e.g., foreign interference) curve represented by line 130.

As described above, in some examples, artificial intelligence techniques may be used for determining correlation. For instance, artificial intelligence mechanisms (e.g., machine-learning) may be superior to standard correlation techniques in more complex situations where (for example) access point 104A experiences less than 100% interference when client device 106B is transmitting.

Figure 4:
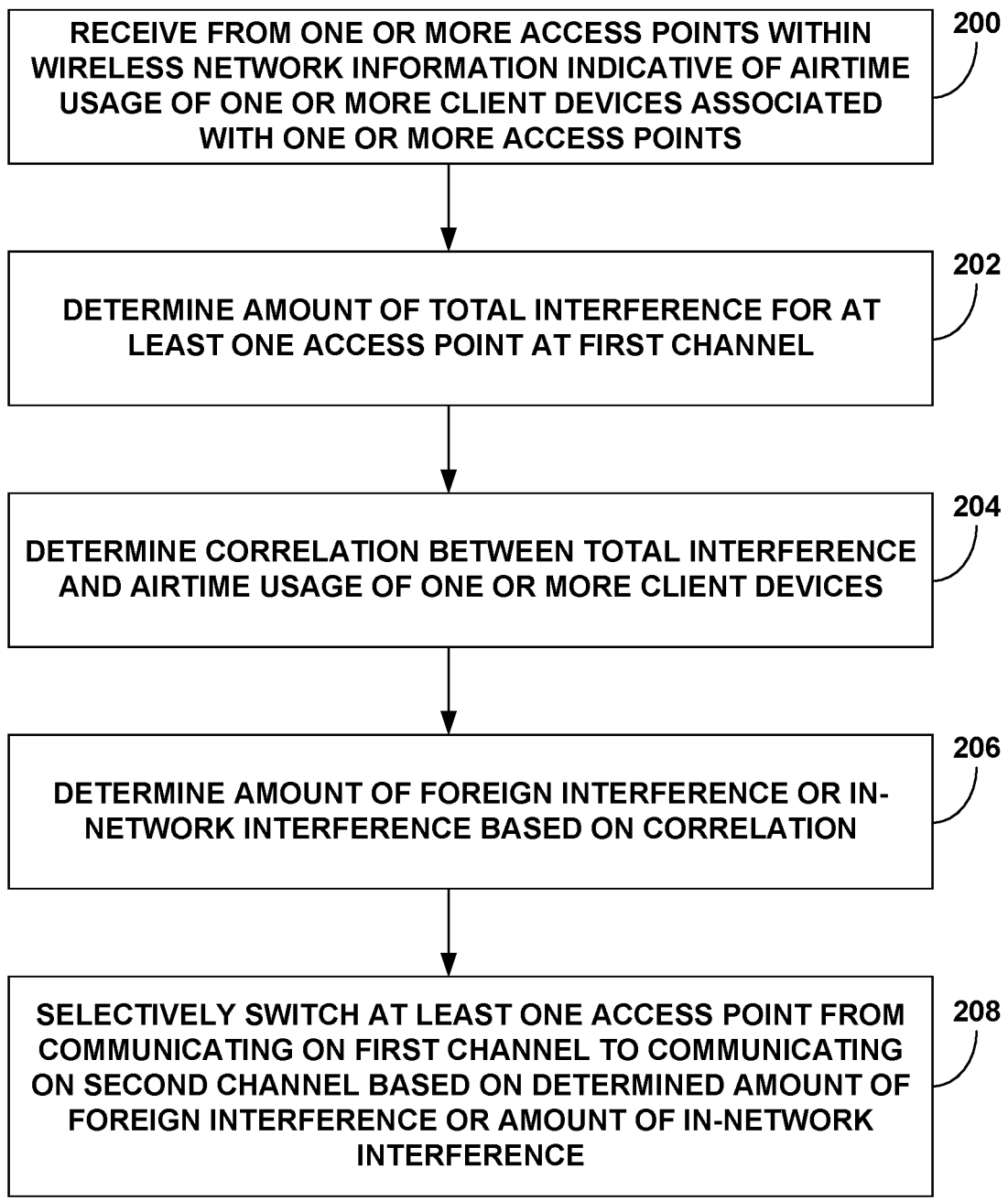
FIG. 4 is a flowchart illustrating example techniques, in accordance with one or more aspects of this disclosure.

FIG. 4 is a flowchart illustrating example techniques, in accordance with one or more aspects of this disclosure. The example of FIG. 4 is described with respect to one or more processors 108 in wireless networks 100A-100C, as non-limiting examples. In one or more examples, one of the one or more access points 104A, 104B includes the one or more processors 108 (e.g., as illustrated in FIG. 1A). In one or more examples, a cloud computing environment 112 includes one or more processors 108 (e.g., as illustrated in FIG. 1B). In one or more examples, a router 114 in an enterprise includes one or more processors 108 (e.g., as illustrated in FIG. 1C). The wireless network(s) 100A-100C may be formed in accordance with the Wi-Fi wireless network protocols.

In one or more examples, one or more processors 108 may be configured to receive from one or more access points (e.g., access point 104B) within a wireless network (e.g., wireless networks 100A-100C), for storage in memory 110, information indicative of airtime usage of one or more client devices 106A, 106B associated with the one or more access points 104A, 104B (200). For example, memory 110 may store airtime usage for first client device 124, airtime usage for second client device 126, and so forth. Airtime usage for first client device 124 and airtime usage for second client device 126 may each be a sequence that includes multiple samples of the respective airtime usage.

As one example, one or more processors 108 may receive from access point 104B of the one or more access points 104A, 104B information indicative of a first airtime usage of a first client device associated with access point 104B. For instance, one or more processors 108 may receive airtime usage for first client device 124 for client 106A associated with access point 104B. One or more processors 108 may receive from the access point 104B of the one or more access points 104A, 104B information indicative of a second airtime usage of a second client device associate with the access point 104B. For instance, one or more processors 108 may receive airtime usage for second client device 126 for client 106B associated with access point 104B.

One or more processors 108 may determine an amount of total interference for at least one of the access points on a first channel (202). The total interference may include foreign interference and in-network interference. The in-network interference may be interference caused by at least one of the one or more client devices 106A, 106B communicating with at least one of the one or more access points (e.g., access point 104B) in wireless network 100A-100C that transfers with channel switching. As an example, the amount of total interference may be a first time value indicative of an amount of time that interference is present within a time period, and the information indicative of the airtime usage may be respective second time values indicative of respective amounts of time that the one or more client devices 106A, 106B communicate during the time period.

One or more processors 108 may determine a correlation between the total interference and the airtime usage of the one or more client devices 106A, 106B (204). For example, one or more processors 108 may determine a first correlation between the total interference and the first airtime usage of the first client device. For example, one or more processors 108 may determine a correlation between a first sequence that includes multiple samples of the amount of total interference (e.g., from total interference 122) and a second sequence that include multiple samples of airtime usage of client device 106A (e.g., from airtime usage for first client device 124). One or more processors 108 may determine a second correlation between the total interference and the second airtime usage of the second client device. For example, one or more processors 108 may determine a correlation between a first sequence that includes multiple samples of the amount of total interference (e.g., from total interference 122) and a third sequence that include multiple samples of airtime usage of client device 106B (e.g., from airtime usage for second client device 126). In one or more examples, one or more processors 108 may be configured to determine a correlation value indicative of the correlation between the total interference and the airtime usage of the one or more client devices.

One or more processors 108 may determine an amount of the foreign interference or an amount of the in-network interference based on the correlation (206). For example, one or more processors 108 may determine an amount of the foreign interference or an amount of the in-network interference based on the airtime usage of client devices 106A, 106B that correlate with the total interference.

As an example to determine the amount of in-network interference, one or more processors 108 may sum together the airtime usage of all client devices 106A, 106B having airtime usage that correlates with the total interference (e.g., a correlation value satisfies a threshold, such as by being greater than the threshold). For example, based on the correlation value satisfying the threshold, one or more processors 108 may sum the airtime usage of the one or more client devices 106A, 106B having the correlation value that satisfies the threshold. As an example to determine the amount of foreign interference, one or more processors 108 may subtract the airtime usage of all client devices 106A, 106B having airtime usage that correlates with the total interference (e.g., a correlation value satisfies a threshold, such as by being greater than the threshold) from the total interference.

One or more processors 108 may selectively switch the at least one of the access points 104A, 104B from communicating on the first channel to communicating on a second channel based on the determined amount of the foreign interference or the determined amount of the in-network interference (208). For example, one or more processors 108 may determine an amount of interference in the wireless network on the second channel, compare the amount of interference in the wireless network on the second channel to the amount of the foreign interference, and selectively switch the at least one of the access points 104A, 104B from communicating on the first channel to communicating on the second channel based on the comparison (e.g., if the interference on the second channel is less than the foreign interference on the first channel).

As another example, one or more processors 108 may determine an amount of interference in the wireless network on the second channel, and add the determined in-network interference to the amount of interference in the wireless network on the second channel to determine a hypothetical total interference on the second channel. One or more processors 108 may compare the hypothetical total interference on the second channel to the total interference on the first channel, and selectively switch the at least one of the access points 104A, 104B from communicating on the first channel to communicating on the second channel based on the comparison (e.g., if the hypothetical total interference on the second channel is less than the total interference on the first channel).

The following describes example techniques in accordance with one or more examples described in this disclosure. The example techniques may be utilized together or separately.

Example 1. A system for interference detection, the system comprising: memory; and one or more processors coupled to the memory and configured to: receive from one or more access points within a wireless network, for storage in the memory, information indicative of airtime usage of one or more client devices associated with the one or more access points; determine an amount of total interference for at least one of the access points on a first channel, the total interference including foreign interference and in-network interference; determine a correlation between the total interference and the airtime usage of the one or more client devices; determine an amount of the foreign interference or an amount of the in-network interference based on the correlation; and selectively switch the at least one of the access points from communicating on the first channel to communicating on a second channel based on the determined amount of the foreign interference or the determined amount of the in-network interference.

Example 2. The system of example 1, wherein to determine the amount of the foreign interference or the amount of the in-network interference based on the correlation, the one or more processors are configured to determine the amount of the foreign interference or the amount of the in-network interference based on the airtime usage, of the one or more client devices, that correlate with the total interference.

Example 3. The system of any of examples 1 and 2, wherein to determine the correlation, the one or more processors are configured to determine a correlation value indicative of the correlation between the total interference and the airtime usage of the one or more client devices, and wherein to determine the amount of the foreign interference, the one or more processors are configured to: determine that the correlation value satisfies a threshold; and based on the correlation value satisfying the threshold, subtract the airtime usage of at least one of the one or more client devices from the total interference to determine the foreign interference.

Example 4. The system of any of examples 1 and 2, wherein to determine the correlation, the one or more processors are configured to determine a correlation value indicative of the correlation between the total interference and the airtime usage of the one or more client devices, and wherein to determine the amount of the in-network interference, the one or more processors are configured to: determine that the correlation value satisfies a threshold; and based on the correlation value satisfying the threshold, sum the airtime usage of the one or more client devices having the correlation value that satisfies the threshold.

Example 5. The system of any of examples 1-4, wherein the in-network interference comprises interference caused by at least one of the one or more client devices communicating with at least one of the one or more access points in the wireless network that transfers with channel switching.

Example 6. The system of any of examples 1-5, wherein the amount of total interference comprises a first time value indicative of an amount of time that interference is present within a time period, and wherein the information indicative of the airtime usage comprises respective second time values indicative of respective amounts of time that the one or more client devices communicate during the time period.

Example 7. The system of any of examples 1-6, wherein to determine the correlation, the one or more processors are configured to determine a time correlation between a first sequence that includes multiple samples of the amount of total interference and one or more additional sequences that each include multiple samples of the airtime usage of the one or more client devices.

Example 8. The system of any of examples 1-7, wherein to receive from one or more access points in the wireless network information indicative of airtime usage of the one or more client devices associated with the one or more access points, the one or more processors are configured to: receive from an access point of the one or more access points information indicative of a first airtime usage of a first client device associated with the access point; and receive from the access point of the one or more access points information indicative of a second airtime usage of a second client device associated with the access point, and wherein to determine correlation between the total interference and the airtime usage of the one or more client devices, the one or more processors are configured to: determine a first correlation between the total interference and the first airtime usage of the first client device; and determine a second correlation between the total interference and the second airtime usage of the second client device.

Example 9. The system of any of examples 1-8, wherein to selectively switch, the one or more processors are configured to: determine an amount of interference in the wireless network on the second channel; compare the amount of interference in the wireless network on the second channel to the amount of the foreign interference; and selectively switch the at least one of the access points from communicating on the first channel to communicating on the second channel based on the comparison.

Example 10. The system of any of examples 1-9, wherein at least one of: one of the one or more access points includes the one or more processors; a cloud computing environment includes the one or more processors; or a router in an enterprise includes the one or more processors.

Example 11. The system of any of examples 1-10, wherein the wireless network is formed in accordance with the Wi-Fi wireless network protocols.

Example 12. A method of interference detection, the method comprising: receiving, with one or more processors, from one or more access points within a wireless network information indicative of airtime usage of one or more client devices associated with the one or more access points; determining, with the one or more processors, an amount of total interference for at least one of the access points on a first channel, the total interference including foreign interference and in-network interference; determining, with the one or more processors, a correlation between the total interference and the airtime usage of the one or more client devices; determining, with the one or more processors, an amount of the foreign interference or an amount of the in-network interference based on the correlation; and selectively switching, with the one or more processors, the at least one of the access points from communicating on the first channel to communicating on a second channel based on the determined amount of the foreign interference or the determined amount of the in-network interference.

Example 13. The method of example 12, wherein determining the amount of the foreign interference or the amount of the in-network interference based on the correlation comprises determining the amount of the foreign interference or the amount of the in-network interference based on the airtime usage, of the one or more client devices, that correlate with the total interference.

Example 14. The method of any of examples 12 and 13, wherein determining the correlation comprises determining a correlation value indicative of the correlation between the total interference and the airtime usage of the one or more client devices, and wherein determining the amount of the foreign interference comprises: determining that the correlation value satisfies a threshold; and based on the correlation value satisfying the threshold, subtracting the airtime usage of at least one of the one or more client devices from the total interference to determine the foreign interference.

Example 15. The method of any of examples 12 and 13, wherein determining the correlation comprises determining a correlation value indicative of the correlation between the total interference and the airtime usage of the one or more client devices, and wherein determining the amount of the in-network interference comprises: determining that the correlation value satisfies a threshold; and based on the correlation value satisfying the threshold, summing the airtime usage of the one or more client devices having the correlation value that satisfies the threshold.

Example 16. The method of any of examples 12-15, wherein the in-network interference comprises interference caused by at least one of the one or more client devices communicating with at least one of the one or more access points in the wireless network that transfers with channel switching.

Example 17. The method of any of examples 12-16, wherein the amount of total interference comprises a first time value indicative of an amount of time that interference is present within a time period, and wherein the information indicative of the airtime usage comprises respective second time values indicative of respective amounts of time that the one or more client devices communicate during the time period.

Example 18. The method of any of examples 12-17, wherein determining the correlation comprises determining a time correlation between a first sequence that includes multiple samples of the amount of total interference and one or more additional sequences that each include multiple samples of the airtime usage of the one or more client devices.

Example 19. The method of any of examples 12-18, wherein receiving from one or more access points in the wireless network information indicative of airtime usage of the one or more client devices associated with the one or more access points comprises: receiving from an access point of the one or more access points information indicative of a first airtime usage of a first client device associated with the access point; and receiving from the access point of the one or more access points information indicative of a second airtime usage of a second client device associate with the access point, and wherein determining correlation between the total interference and the airtime usage of the one or more client devices comprises: determining a first correlation between the total interference and the first airtime usage of the first client device; and determining a second correlation between the total interference and the second airtime usage of the second client device.

Example 20. A computer-readable storage medium storing instructions thereon that when executed cause one or more processors to: receive from one or more access points within a wireless network information indicative of airtime usage of one or more client devices associated with the one or more access points; determine an amount of total interference for at least one of the access points on a first channel, the total interference including foreign interference and in-network interference; determine a correlation between the total interference and the airtime usage of the one or more client devices; determine an amount of the foreign interference or an amount of the in-network interference based on the correlation; and selectively switch the at least one of the access points from communicating on the first channel to communicating on a second channel based on the determined amount of the foreign interference or the determined amount of in-network interference.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system for interference detection, the system comprising:
   memory; and
   one or more processors coupled to the memory and configured to:
   determine an amount of total interference for a first access point on a first channel,
   determine an amount of foreign interference or an amount of in-network interference based on the total interference for the first access point,
   wherein the first access point is one of a plurality of access points within a wireless network, and one or more of the plurality of access points are each associated with one or more client devices,
   wherein the total interference includes the foreign interference and the in-network interference,
   wherein the in-network interference comprises interference, caused at least by one or more client devices associated with a second access point of the plurality of access points within the wireless network communicating with the second access point, that transfers with channel switching, and
   wherein the foreign interference comprises interference that does not transfer with channel switching;
   selectively switch the first access point from communicating on the first channel to communicating on a second channel based on the determined amount of the foreign interference or the determined amount of the in-network interference.

2. The system of claim 1, wherein the one or more processors are configured to:
   receive information indicative of airtime usage of the one or more client devices associated with second access point,
   wherein to determine the amount of the foreign interference or the amount of the in-network interference, the one or more processors are configured to determine the amount of foreign interference or the amount of the in-network interference based on the total interference for the first access point and the information indicative of the airtime usage.

3. The system of claim 2, wherein the one or more processors are configured to determine a correlation between the total interference and the airtime usage of the one or more client devices associated with the second access point, and wherein to determine the amount of foreign interference or the amount of the in-network interference based on the total interference for the first access point and the information indicative of the airtime usage, the one or more processors are configured to determine the amount of foreign interference or the amount of the in-network interference based on the correlation.

4. The system of claim 3,
   wherein to determine the correlation, the one or more processors are configured to determine a correlation value indicative of the correlation between the total interference and the airtime usage of the one or more client devices associated with the second access point, and
   wherein to determine the amount of the foreign interference, the one or more processors are configured to:
   determine that the correlation value satisfies a threshold; and
   based on the correlation value satisfying the threshold, subtract the airtime usage of at least one of the one or more client devices from the total interference to determine the foreign interference.

5. The system of claim 3,
   wherein to determine the correlation, the one or more processors are configured to determine a correlation value indicative of the correlation between the total interference and the airtime usage of the one or more client devices associated with the second access point, and
   wherein to determine the amount of the in-network interference, the one or more processors are configured to:
   determine that the correlation value satisfies a threshold; and
   based on the correlation value satisfying the threshold, sum the airtime usage of the one or more client devices associated with the second access point having the correlation value that satisfies the threshold.

6. The system of claim 3, wherein to determine the correlation, the one or more processors are configured to determine a time correlation between a first sequence that includes multiple samples of the amount of total interference and one or more additional sequences that each include multiple samples of the airtime usage of the one or more client devices associated with the second access point.

7. The system of claim 3,
wherein to receive information indicative of airtime usage of the one or more client devices associated with the second access point, the one or more processors are configured to:
  receive from the second access point information indicative of a first airtime usage of a first client device associated with the second access point; and
  receive from the second access point information indicative of a second airtime usage of a second client device associated with the second access point, and
wherein to determine correlation between the total interference and the airtime usage of the one or more client devices associated with the second access point, the one or more processors are configured to:
  determine a first correlation between the total interference and the first airtime usage of the first client device; and
  determine a second correlation between the total interference and the second airtime usage of the second client device.

8. The system of claim 2, wherein the amount of total interference comprises a first time value indicative of an amount of time that interference is present within a time period, and wherein the information indicative of the airtime usage comprises respective second time values indicative of respective amounts of time that the one or more client devices associated with the second access point communicate during the time period.

9. The system of claim 1, wherein to selectively switch, the one or more processors are configured to:
  determine an amount of interference in the wireless network on the second channel;
  compare the amount of interference in the wireless network on the second channel to the amount of the foreign interference; and
  selectively switch the first access point from communicating on the first channel to communicating on the second channel based on the comparison.

10. The system of claim 1, wherein at least one of:
the first access point includes the one or more processors;
a cloud computing environment includes the one or more processors; or
a router in an enterprise includes the one or more processors.

11. The system of claim 1, wherein the wireless network is formed in accordance with Wi-Fi wireless network protocols.

12. A method of interference detection, the method comprising:
  determining an amount of total interference for a first access point on a first channel,
  determining an amount of foreign interference or an amount of in-network interference based on the total interference for the first access point,
  wherein the first access point is one of a plurality of access points within a wireless network, and one or more of the plurality of access points are each associated with one or more client devices,
  wherein the total interference includes the foreign interference and the in-network interference,
  wherein the in-network interference comprises interference, caused at least by one or more client devices associated with a second access point of the plurality of access points within the wireless network communicating with the second access point, that transfers with channel switching, and
  wherein the foreign interference comprises interference that does not transfer with channel switching;
  selectively switching the first access point from communicating on the first channel to communicating on a second channel based on the determined amount of the foreign interference or the determined amount of the in-network interference.

13. The method of claim 12, further comprising:
receiving information indicative of airtime usage of the one or more client devices associated with second access point,
wherein determining the amount of the foreign interference or the amount of the in-network interference comprises determining the amount of foreign interference or the amount of the in-network interference based on the total interference for the first access point and the information indicative of the airtime usage.

14. The method of claim 13, further comprising:
determining a correlation between the total interference and the airtime usage of the one or more client devices associated with the second access point,
wherein determining the amount of foreign interference or the amount of the in-network interference based on the total interference for the first access point and the information indicative of the airtime usage comprises determining the amount of foreign interference or the amount of the in-network interference based on the correlation.

15. The method of claim 14,
wherein determining the correlation comprises determining a correlation value indicative of the correlation between the total interference and the airtime usage of the one or more client devices associated with the second access point, and
wherein determining the amount of the foreign interference comprises:
  determining that the correlation value satisfies a threshold; and
  based on the correlation value satisfying the threshold, subtracting the airtime usage of at least one of the one or more client devices from the total interference to determine the foreign interference.

16. The method of claim 14,
wherein determining the correlation comprises determining a correlation value indicative of the correlation between the total interference and the airtime usage of the one or more client devices associated with the second access point, and
wherein determining the amount of the in-network interference comprises:
  determining that the correlation value satisfies a threshold; and
  based on the correlation value satisfying the threshold, summing the airtime usage of the one or more client devices associated with the second access point having the correlation value that satisfies the threshold.

17. The method of claim 14, wherein determining the correlation comprises determining a time correlation between a first sequence that includes multiple samples of the amount of total interference and one or more additional sequences that each include multiple samples of the airtime usage of the one or more client devices associated with the second access point.

18. The method of claim 12, wherein selectively switching comprises:
- determining an amount of interference in the wireless network on the second channel;
- comparing the amount of interference in the wireless network on the second channel to the amount of the foreign interference; and
- selectively switching the first access point from communicating on the first channel to communicating on the second channel based on the comparison.

19. The method of claim 12, wherein the wireless network is formed in accordance with Wi-Fi wireless network protocols.

20. A non-transitory computer-readable storage medium storing instructions thereon that when executed cause one or more processors to:
- determine an amount of total interference for a first access point on a first channel,
- determine an amount of foreign interference or an amount of in-network interference based on the total interference for the first access point,
- wherein the first access point is one of a plurality of access points within a wireless network, and one or more of the plurality of access points are each associated with one or more client devices,
- wherein the total interference includes the foreign interference and the in-network interference,
- wherein the in-network interference comprises interference, caused at least by one or more client devices associated with a second access point of the plurality of access points within the wireless network communicating with the second access point, that transfers with channel switching, and
- wherein the foreign interference comprises interference that does not transfer with channel switching;
- selectively switch the first access point from communicating on the first channel to communicating on a second channel based on the determined amount of the foreign interference or the determined amount of the in-network interference.

\* \* \* \* \*